W. C. HAY.
APPARATUS FOR THE MANUFACTURE OF MORTAR.
APPLICATION FILED SEPT. 17, 1913.
1,117,670.
Patented Nov. 17, 1914.
2 SHEETS—SHEET 1.
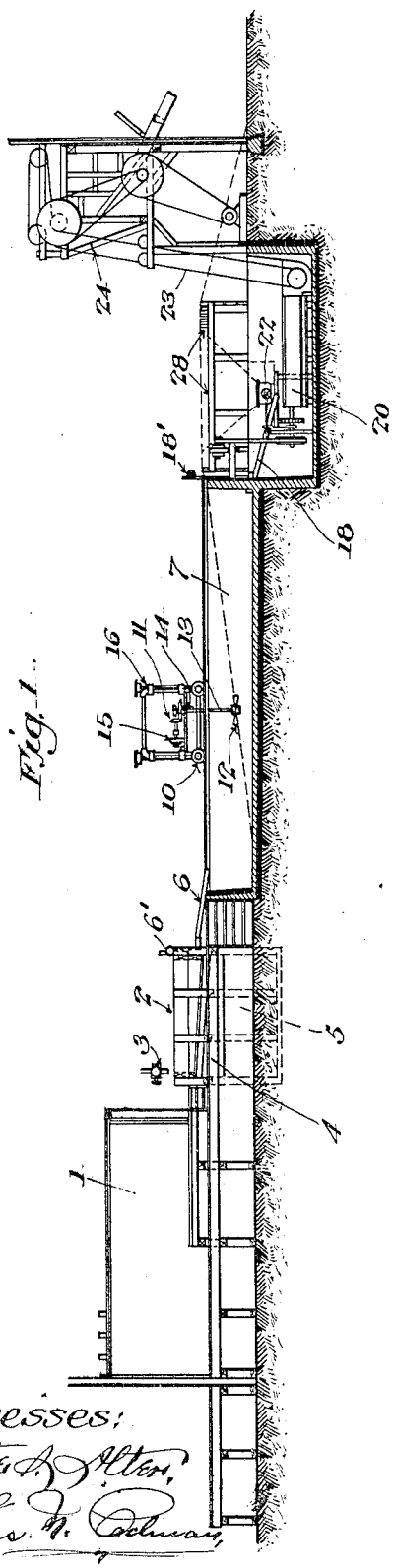
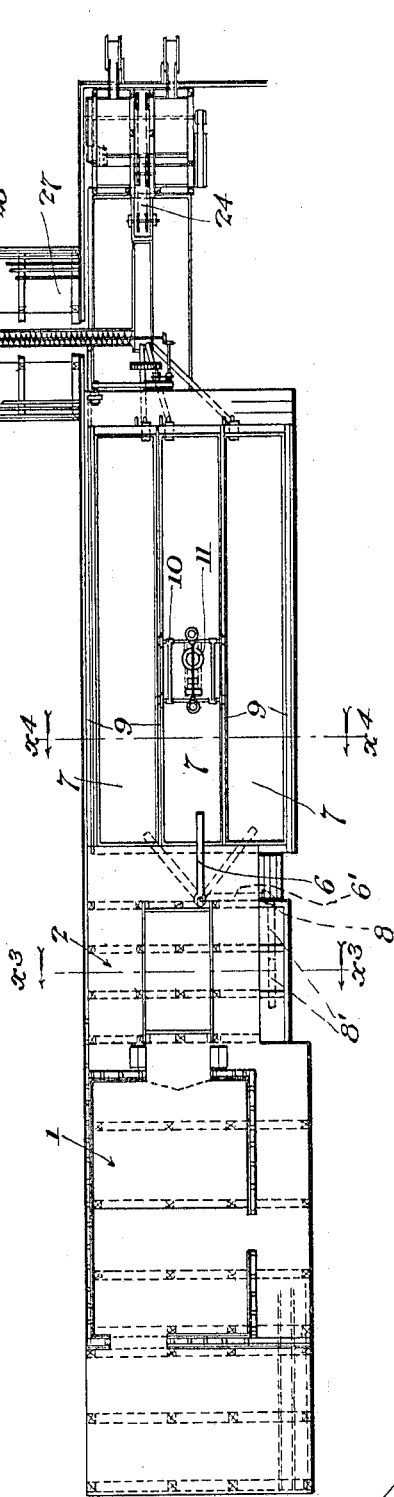

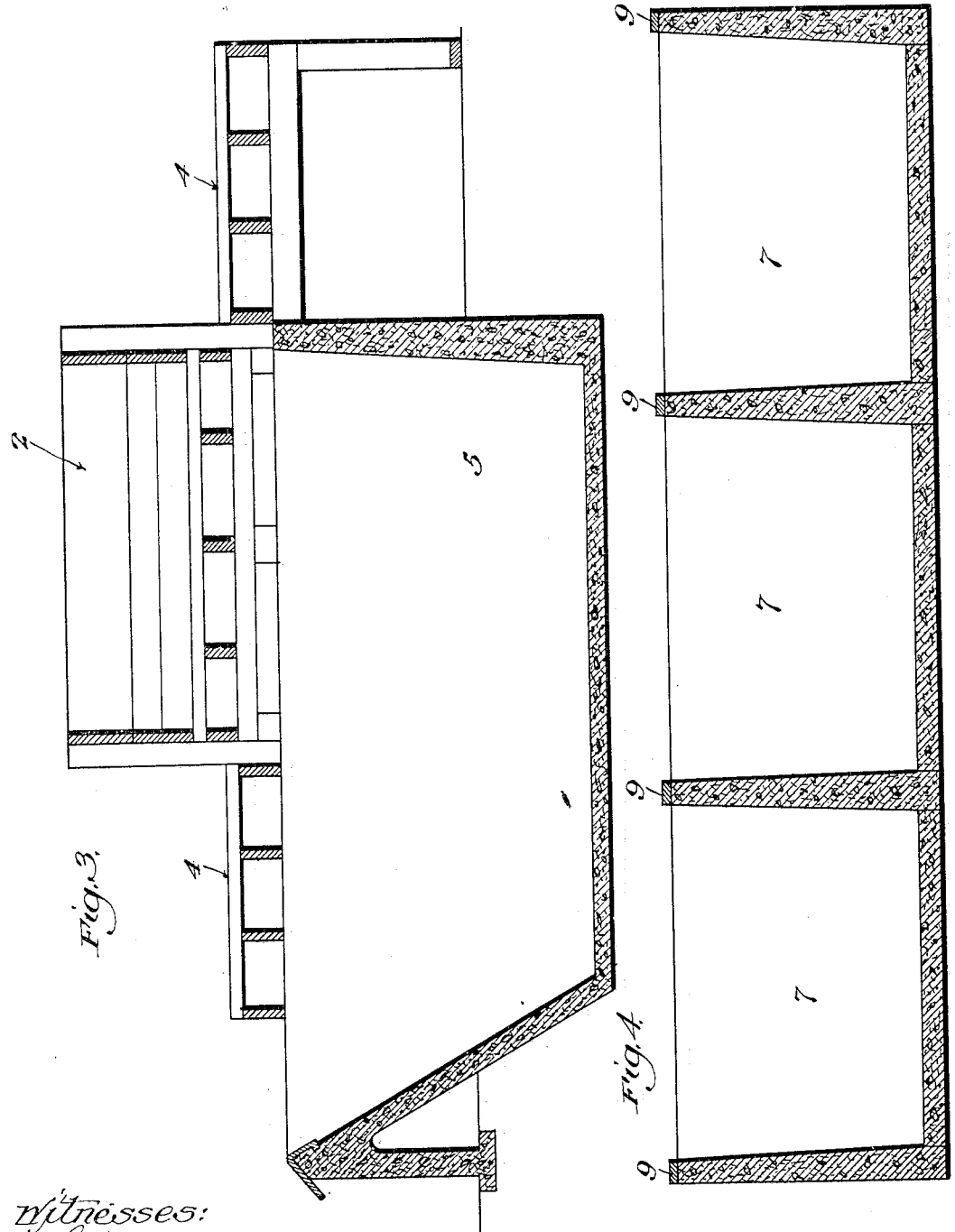

UNITED STATES PATENT OFFICE.

WILLIAM CAREY HAY, OF LOS ANGELES, CALIFORNIA.

APPARATUS FOR THE MANUFACTURE OF MORTAR.

1,117,670.   Specification of Letters Patent.   Patented Nov. 17, 1914.

Application filed September 17, 1913. Serial No. 790,319.

*To all whom it may concern:*

Be it known that I, WILLIAM CAREY HAY, a subject of the King of the United Kingdom of Great Britain and Ireland, having declared my intention of becoming a citizen of the United States, residing at Los Angeles, in the county of Los Angeles and State of California, have invented a new and useful Apparatus for the Manufacture of Mortar, of which the following is a specification.

This invention relates to the manufacture of mortar such as is used in the construction of buildings. In the usual process of manufacturing such mortar on a large scale, it is requisite to cure the slaked lime for a certain time before it is mixed with the sand, etc., and it is also necessary to agitate the cured slaked lime or putty so as to break it up and render it sufficiently fluid for the mixing operation.

The present invention relates particularly to means whereby the operations of slaking the lime, curing and breaking up the cured product, mixing with the sand, etc., and delivery of the final product to the distributing means, may be effected in a convenient and economical manner, and with a minimum of labor.

A further object of the invention is to provide means whereby a certain proportion of the slaked lime or putty constituting a finer or special product may be reserved and delivered separately for use in plaster or finishing material.

Other objects of the invention will appear hereinafter.

The accompanying drawings illustrate an embodiment of my invention, and referring thereto:

Figure 1 is a longitudinal section of the apparatus. Fig. 2 is a plan view thereof. Fig. 3 is a transverse section on line $x^3$—$x^3$ in Fig. 1. Fig. 4 is a section on line $x^4$—$x^4$ in Fig. 1.

1 designates a lime room for containing the quick-lime and 2 designates the slaking bin into which the lime from the lime room 1 and water from any suitable supply such as indicated at 3, are supplied to produce the slaked lime for use in the mortar. At each side of the slaking bin 2 is provided a platform 4 on which the operator stands. Below the slaking bin 2 are arranged several aging vats 5 to receive putty or lime slaked and drawn off with water for aging for use in plaster. A discharge pipe 6 leads from the slaking bin 2 to curing vats 7 and is preferably swiveled so as to swing into position to deliver the slaked lime to any one of a number of curing vats 7, a suitable gate 6' being provided for said discharge pipe. Said curing vats are located side by side and extend longitudinally of the apparatus and are preferably of considerable length so as to provide for large curing and agitating capacity, and track rails 9 extend alongside the respective curing vats 7 to receive and guide a truck 10 for agitating means 11. Said agitating means comprises paddles or beaters 12 on a shaft 13 mounted to rotate in bearings 14, and provided with suitable driving means 15 and elevating and lowering means 16, whereby the agitator devices 12 may be caused to revolve or may be raised and lowered as required. The construction of this agitator is not herein shown or described in detail as it forms the subject matter of a separate application filed by me on September 17th, 1913, Serial No. 790320, and any suitable agitating means may be used on the truck 10 to provide for agitation or breaking up of the cured slaked lime. Delivery pipes 18 having controlling gates 18' lead from the several curing vats 7 to a mixer 20 which may be of any usual or suitable construction and is provided with suitable means for supplying sand, etc. to the slaked lime. Suitable elevating means indicated at 23 are provided for taking the mixed product or mortar from the mixer and elevating it to suitable storage and delivery means such as bins 24. The slaking bin 2, curing vats 7, and mixer 20 are arranged at progressively lower levels, so that the material may flow by gravity from each of said devices to the next one.

Alongside of the mixer 20 is located a storage bin 27 for sand, preferably provided with a grizzly 28 at its top and with inclined or other suitable apparatus for hauling the sand and dumping it into the grizzly. A conveyer, for example, a screw conveyer 30, is provided for feeding the sand from the bottom of this storage bin to the mixer, said conveyer delivering the sand at a point adjacent to the inlets of the putty supply pipes 18.

The operation is as follows: The lime is charged into the bin 2 and the water supplied to said bin, acts on the lime to slake the same. The operator hoes or otherwise manipulates the lime while in the slaking bin, so as to incorporate the same with the water and any desired amount of the resulting liquid containing slaked lime may be drawn off into the aging vats 5 below the slaking bin. That portion of the slaked lime or putty which is intended for use in mortar is drawn through the discharge pipe 6 to any one of the several curing vats 7, these vats being filled one at a time, so that, for example, the filling operation may be taking place in one, while the curing is being effected in another and the agitation or breaking up of the slaked and cured lime in the third. When any vat 7 has been filled the charging pipe 6 is shifted to another vat and the slaked lime is allowed to stand in this vat until cured, this operation requiring a considerable time. When the slaked lime or putty has been cured it attains a certain stiffness or consistency due to an incipient set and in order to allow the material to be drawn off from the vat and to be easily worked in the mixer, it is necessary to break it up. For this purpose the truck 10 carrying the agitator is moved onto the pair of truck wheels corresponding to the vat whose contents are to be agitated and the agitating device 12 being lowered into the vat is set in operation, so as to stir or beat the contents of the vat and break up the same to a relatively fluid condition. The discharge gate 18' corresponding to that vat is then opened, allowing the contents of the vat to flow by gravity to the mixer 20, the bottom of the vat being slightly inclined as shown in Fig. 1, so that the cured slaked lime after it is broken up or rendered fluid will flow to the discharge pipe. The cured slaked lime or putty passing to the mixer 20 is therein mixed with the sand, etc., supplied by the feed means 30 and the resulting mortar is elevated by elevator 23 to the delivery bin 24. It will be seen that the transfer or forward movement of the material from the slaking bin to the mixer is by gravity all the way.

Whenever it is desired to receive a portion of the putty formed in the slaking bin, for use as plaster, etc., the discharge pipe 6 is turned to position shown at 6' in Fig. 1, so as to discharge into the aging vats 5, a suitable elbow 8 and pipe sections 8' being slipped on to said discharge pipe to carry the material to any desired one of the vats 5.

What I claim is:

1. An apparatus for the manufacture of mortar, comprising a slaking bin, a plurality of curing vats, means for discharging the slaked lime from the slaking bins, into any one of said curing vats, means for agitating the cured lime putty in said curing vats until it is in fluid condition and means for allowing the fluid cured lime to flow from any of said curing vats independently of the other said vats.

2. An apparatus for the continuous manufacture of mortar, comprising a slaking bin, a plurality of curing vats, means for discharging the slaked lime from the said slaking bin to the curing vats, means for agitating the cured lime in any one of said curing vats until the lime is in a fluid condition, a mixer located below the level of the curing vats and means for allowing the fluid cured lime to flow from any one of said curing vats independently of the other vats into said mixer.

3. An apparatus for the continuous manufacture of mortar comprising a slaking bin, a plurality of curing vats, means for discharging the slaked lime from said slaking bin into any one of said curing vats, means for treating the cured lime so that it is reduced to a fluid condition, a mixer and means for discharging the fluid cured lime from any one of said curing vats to said mixer.

4. An apparatus for the continuous manufacture of mortar comprising a lime storage bin, a slaking bin immediately adjacent and below said storage bin, a curing vat adapted to receive the slaked lime from said slaking bin, means for treating lime in said curing vats after it is properly cured for mixing, and a mixer into which the lime from the curing vat is discharged and mixed with sand.

In testimony whereof, I have hereunto set my hand at Los Angeles, California, this 8th day of September, 1913.

WILLIAM CAREY HAY.

In presence of—
CHAS. F. CADMAN,
A. P. KNIGHT.